Aug. 5, 1969   L. W. SUMANSKY   3,459,047
GAS SAMPLING PROBE
Filed June 21, 1967
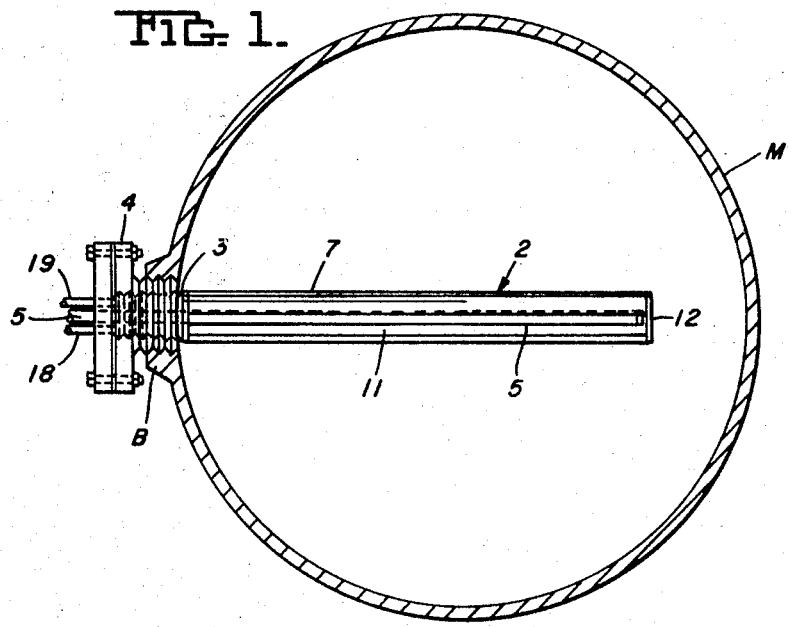
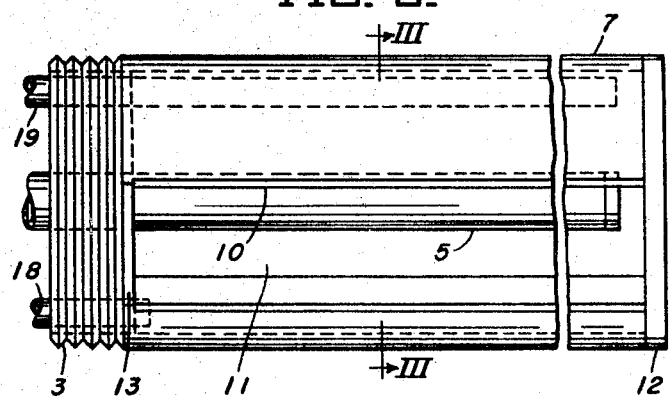
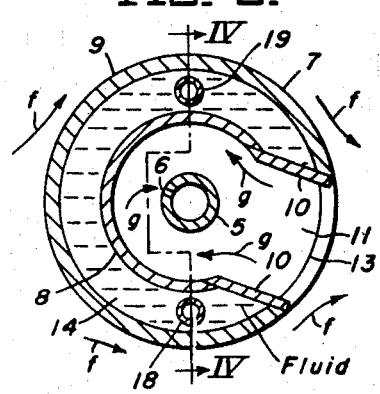
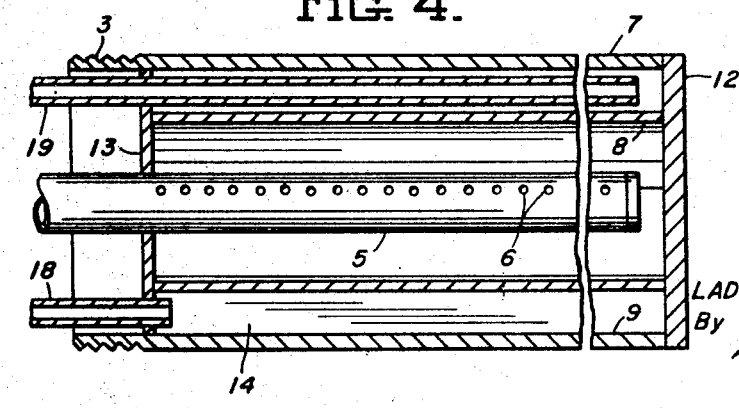
INVENTOR.
LADISLAUS WALTER SUMANSKY
By Donald G. Dalton
Attorney

United States Patent Office 3,459,047
Patented Aug. 5, 1969

3,459,047
GAS SAMPLING PROBE
Ladislaus Walter Sumansky, Library, Pa., assignor to the United States Steel Corporation, a corporation of Delaware
Filed June 21, 1967, Ser. No. 647,851
Int. Cl. G01n 1/22
U.S. Cl. 73—421.5               2 Claims

ABSTRACT OF THE DISCLOSURE

A gas sampling probe comprising an elongated tube with gas intake openings along one side thereof, said tube being partially surrounded by an elongated sheath. When the probe is inserted in the gas main from which samples are to be taken, the openings in the elongated tube face generally upstream, and the sheath stands in front of these openings, protecting them from direct exposure to the gas stream. The sheath may be either heated or cooled, depending on the type of gas and conditions in which the probe is used.

---

This invention relates to probes for sampling gas flowing through a gas main, for the purpose of analyzing the components of the gas. More particularly, the invention relates to probes for sampling gases which carry suspended solids or have components which under certain conditions will form solids.

The standard technique used in taking gas samples from a gas main is to insert through the wall of the main an elongated tube with small openings spaced therealong. The forward end of the tube inside the gas main is closed, while the rear end outside the gas main is connected to a gas line leading to a gas switching system and analyzer. The openings in the side of the tube face upstream into the flow of gas to be sampled.

One of the problems with sampling gas in this manner is that the small openings in the tube are susceptible to clogging by solid particles suspended in the gas stream. Also, with certain types of gases, solids may condense inside the sampling tube or in the tubes and valves of the gas switching system and analyzer. Thus, these tubes frequently become clogged and have to be cleaned before more gas samples can be taken.

An example of a situation presenting both of these problems is in the sampling of coke oven gases. These gases contain tar, naphthalene, and other components which tend to clog gas sampling systems. They exist both in the form of suspended solids and in the form of vapors which on cooling condense to solids or liquids.

An object of my invention, therefore, is to provide a probe that will take samples of gases without causing the above clogging problems, even though the gases contain suspended solids or have a tendency to form solids below a specific temperature.

Another object of my invention is to provide a gas sampling probe that will efficiently heat or cool the gases to a desired temperature range as they are taken from the gas main.

These and other objects are achieved by my invention as will be more apparent from the following detailed description thereof referring to the attached drawings in which:

FIGURE 1 is a cross-sectional view of a gas main showing a gas sampling probe mounted therein;

FIGURE 2 is an enlarged side elevation of the gas sampling probe of FIGURE 1;

FIGURE 3 is a cross-sectional view of the probe of FIGURE 1, taken along the plane of line III—III of FIGURE 2; and FIGURE 4 is a longitudinal section of the probe of FIGURE 1, taken along the plane of line IV—IV of FIGURE 3.

Referring to FIGURE 1, a gas sampling probe 2 is inserted inside a gas main M. The probe 2 has threads 3 which engage a flanged bushing 4. A boss B is provided on the wall of gas main M, and the flanged bushing 4 is screwed into a tapped hole through the center of boss B.

As seen in the enlarged views in FIGURES 2, 3, and 4, the probe 2 comprises an elongated, stainless steel gas sampling tube 5, partially surrounded by a double-walled sheath 7. When the probe 2 is properly oriented in the gas main M, the gases in the main M flow around the probe in the direction of arrows $f$ (FIGURE 3). The sampling tube has holes 6, which face generally upstream of the gas flow $f$ but are shielded by the sheath 7. The holes 6 are preferably of 1/8" diameter and are spaced approximately 2" apart along the length of tube 5.

The sheath 7 is made of two coaxial carbon steel walls 8 and 9. Tie plates 10 (FIGURE 3) join the walls 8 and 9 together and form an elongated slot 11. The sheath 7, which has a generally horse-shoe shape in section, is positioned with slot 11 tilted slightly downward, so that molten materials collected on the inner sheath wall 8 run off the sheath over bottom tie plate 10. End plates 12 and 13 welded to the walls 8 and 9 (FIGURE 4) complete a closed chamber 14 inside sheath 7.

Extending through plate 13 into chamber 14 are a fluid inlet tube 18 and a fluid outlet tube 19. As shown in FIGURE 4, the inlet tube 18 extends into the chamber 14 only to a point just past the plate 13, while the outlet tube 19 extends practically the full length of the chamber 14 to a point near plate 12. The sheath 7 is heated by introducing heated fluid into chamber 14 through inlet tube 18, and withdrawing the cooled, circulated fluid through outlet tube 19.

The type of fluid used and the temperature of the fluid introduced in inlet tube 18 are determined by the type of gas in gas main M that is to be sampled. If the gas is raw coke oven gas, the recommended fluid is water at a temperature of 170° F. This is the temperature required for keeping tar, naphthalene and other materials deposited on the sheath 7 in a liquid state so that they will run off the sheath, and for insuring that no further condensation of such materials will occur in the sampling tube 5. If the water temperature is too high (190° F. or higher), polymerization will occur in the gases near the sheath 7. Harmful resins resulting from polymerization will then build up in the valves of the gas switching system and analyzer connected to the probe 2.

As an example of my invention in operation, the probe 2 is placed in a stream of coke oven gases flowing in the direction of arrows $f$ (FIGURE 3). On the downstream side of probe 2, a portion of these gases will flow through slot 11 in sheath 7 and travel, as indicated by arrows $g$ into the space between sampling tube 5 and the inner wall 8 of sheath 7. Here the gases are heated by the sheath 7, which is in turn heated by water in chamber 14 to 170° F. This heating serves two purposes. First, it keeps the tar, naphtalene and other materials, deposited by the dirty gases on the sheath wall 8, in a molten state so that they run off the sheath over bottom tie plate 10. Secondly, by raising the temperature of the gases as they flow into the sampling tube 5 through holes 6, the heated sheath 7 prevents condensation of materials on the inside wall of the tube 5, which could clog it or holes 6.

Once inside the sampling tube 5 (FIGURE 4) the coke oven gases are carried by a heated tube connected to the left end of tube 5 to an appropriate gas switching system and analyzer. The pressure of the coke oven gases will usually be sufficient to assure a steady flow of gas through the sampling tube 5 and into the gas switching system and analyzer, without the need for a pump or other vacuum source in the sampling line. However, in other applications of my invention, it will be desirable to connect a vacuum source to the sampling tube 5.

With some applications of my invention, it may be desirable to cool the sheath 7, rather than heat it. In such cases, Freon or another refrigerant might be circulated through the chamber 14. In other applications, the high temperatures produced by steam or other hot gases would be desirable, and thus these gases would be circulated through chamber 14.

I claim:

1. A probe for taking gas samples from a stream of gas, comprising an elongated tube having a hole therein intermediate its ends, said tube being oriented in said gas stream with said hole facing in a generally upstream direction, a tubular sheath extending along the length of said tube and spaced from and enveloping said tube, said sheath being generally of horse-shoe shape and having its open side facing in a generally downstream direction in said gas stream, so as to shield said hole in the tube from direct exposure thereto.

2. The gas sampling probe of claim 1 wherein said sheath includes two spaced apart longitudinal walls extending over said tube and end plates secured to the ends of said walls to form an enclose chamber in said sheath, said probe including means for conducting a fluid into and out of said chamber.

References Cited

UNITED STATES PATENTS

| | | | |
|---|---|---|---|
| 1,890,592 | 12/1932 | Stein et al. | 73—421.5 |
| 1,890,627 | 12/1932 | Stein et al. | 73—421.5 |
| 2,687,185 | 8/1954 | McChesney | 73—421.5 X |

S. CLEMENT SWISHER, Primary Examiner

U.S. Cl. X.R.

73—422